United States Patent [19]

Korth

[11] Patent Number: 5,026,014

[45] Date of Patent: Jun. 25, 1991

[54] SUPPORTING FRAME

[75] Inventor: Bernd Korth, Weil am Rhein, Fed. Rep. of Germany

[73] Assignee: Protoned B. V., Amsterdam, Netherlands

[21] Appl. No.: 494,574

[22] Filed: Mar. 16, 1990

[30] Foreign Application Priority Data

Mar. 21, 1989 [CH] Switzerland .................... 1033/89

[51] Int. Cl.$^5$ .................................. A47K 1/00
[52] U.S. Cl. ............................ 248/225.2; 211/189;
403/231; 403/364
[58] Field of Search .............. 248/225.2, 225.1, 224.4,
248/227, 150, 165; 108/107, 144; 211/189, 190;
403/208, 263, 231, 364

[56] References Cited

U.S. PATENT DOCUMENTS

| | | | |
|---|---|---|---|
| 3,273,720 | 9/1966 | Seiz | 108/107 X |
| 4,064,996 | 12/1977 | Shillum | 108/107 X |
| 4,515,494 | 5/1985 | Robilliard et al. | 211/190 X |
| 4,540,308 | 9/1985 | Colby | 211/189 X |
| 4,874,148 | 10/1989 | Guinter | 248/225.2 |

Primary Examiner—Ramon O. Ramirez
Attorney, Agent, or Firm—Ralph W. Selitto, Jr.

[57] ABSTRACT

Two free-standing tubular columns (1, 2) having slots (3), parallel to the longitudinal axis of the tube, for locating extension arms or supporting arrangements are connected to one another according to the modular construction principle by means of a cross connection (4). The cross connection (4) of two connecting tubes (5, 6) contain, at their ends, one attachment housing (8) each, in which, on the one hand, these two connecting tubes (5, 6) are held and, on the other hand, a clamping bracket (13) having catch projections (16) is accommodated. The catch projections (16) are intended for engaging into the slots (3) of the tubular columns (1, 2). Each attachment housing (8) is provided at the front face with a surface contour complementary to the outer contour of the colunm, and a clamping screw (17) preloading the clamping bracket (13) against the attachment housing brings about an applied-pressure connection between the attachment housings (8) and the tubular columns (1, 2).

4 Claims, 2 Drawing Sheets

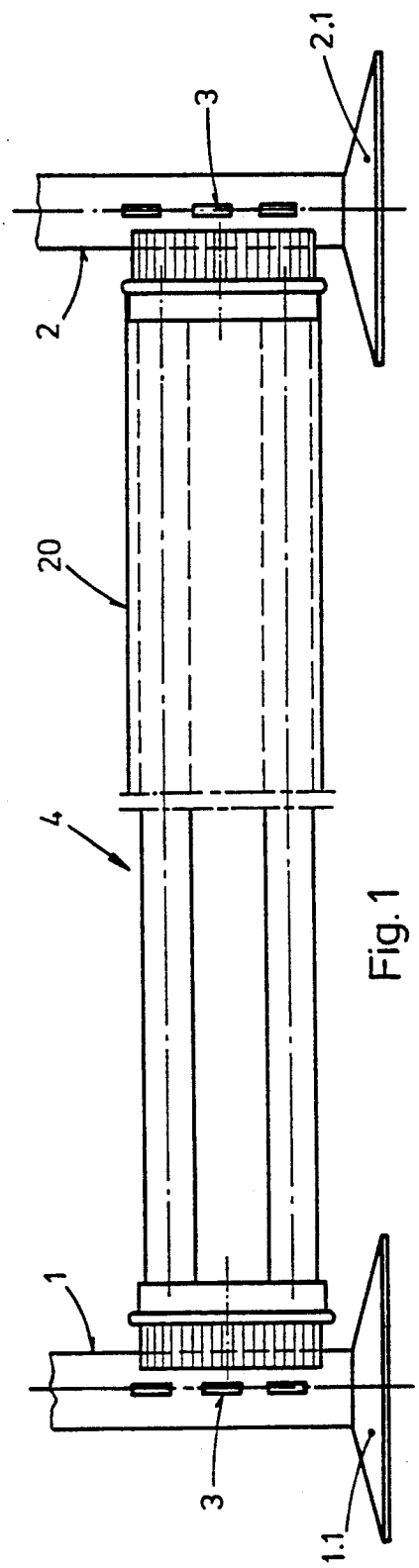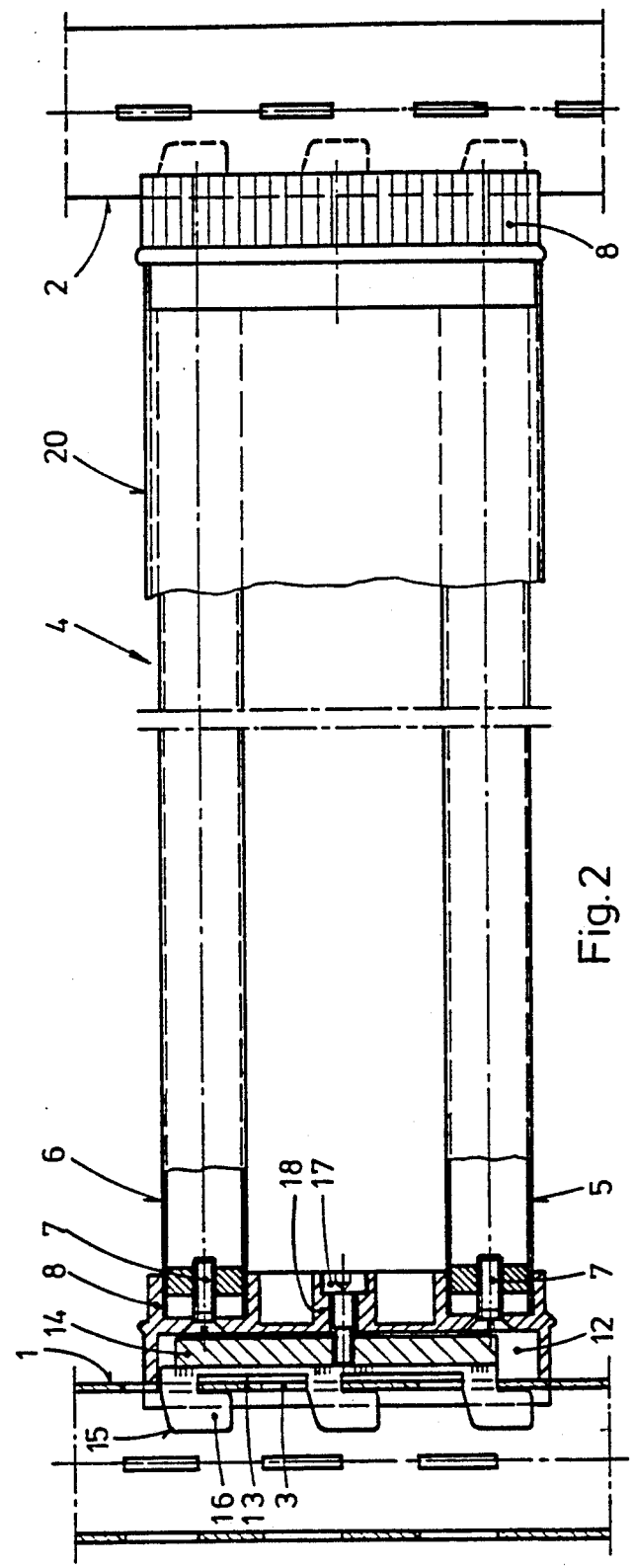
Fig.1
Fig.2

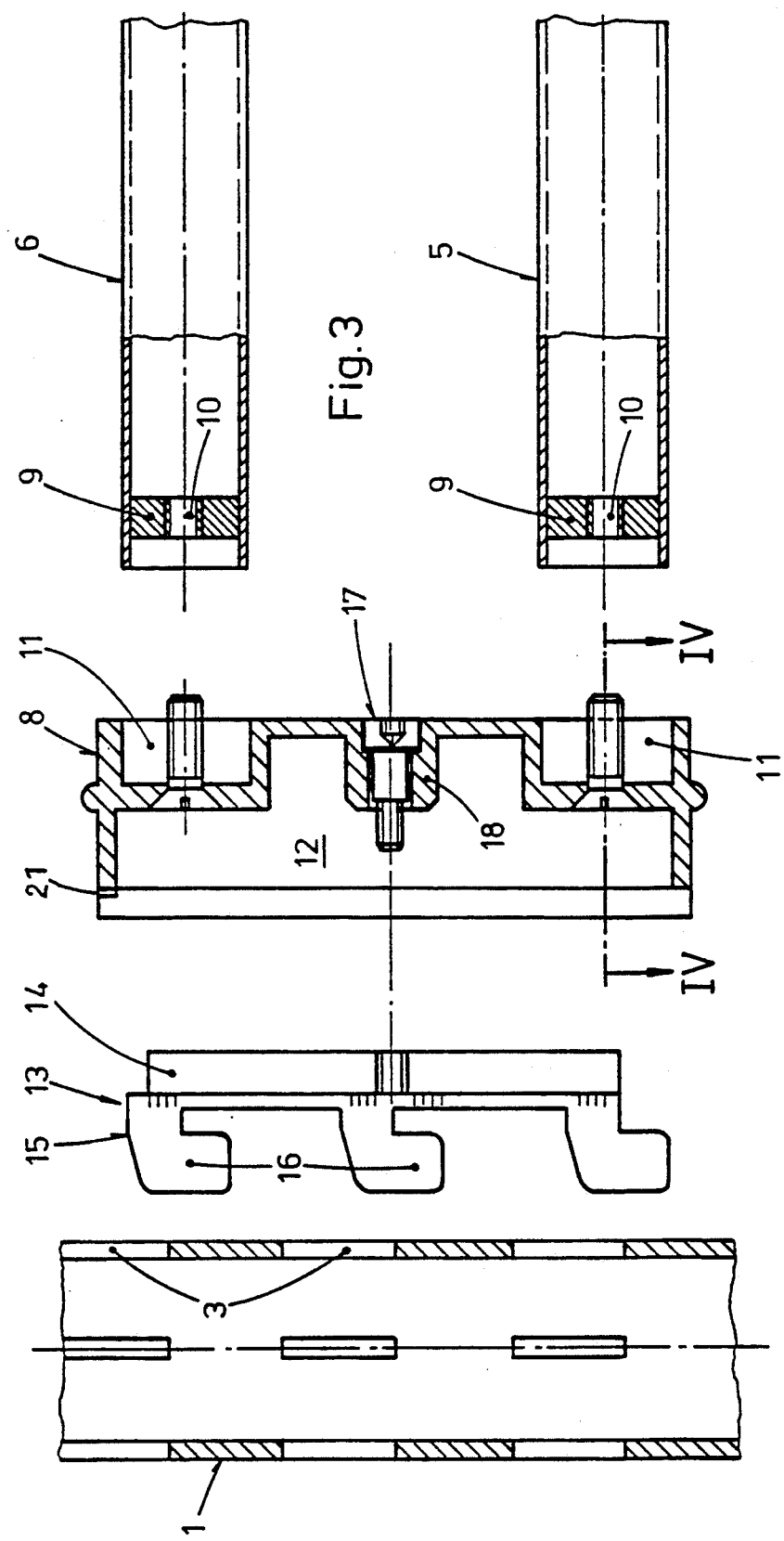

SUPPORTING FRAME

The present invention relates to a supporting frame according to the preamble of patent claim 1.

It is known to fit cross pieces to supporting frames which are built up according to the modular construction principle and have two or more supporting columns which are at a distance from one another and are disposed on individual feet arrangements, which cross pieces can be suspended between adjacent columns, in each case at least two individual bar elements having to be arranged at different vertical positions to obtain an arrangement capable of bearing load. Since such cross pieces are normally in contact with the supporting columns by snap engagement or engagement by gravitational force and have to be detachable without a tool in order to manipulate them, supporting frames of such construction are only stable as long as the cross pieces are also suitably loaded. On the other hand, if frames having considerably fluctuating loads and complicated configurations of layout are to be erected, snap engagement and engagement by gravitational force prove to be inadequate connecting measures.

Supporting frames of this type are considerably more difficult to realize if the cross pieces, for design reasons, have to be arranged close together and in addition near to the feet, since here, even with precisely matched engagement, scarcely shakeproof connections can be produced.

The object of the present invention is thus to create a supporting frame according to the modular construction principle in which cross pieces in multiple-bar element arrangements can be attached by means of conventional hook-engagement means to column pairs in such a way as to lie close together in a stable manner.

The achievement, according to the invention, of this object is revealed in patent claim 1. Embodiments of the supporting frame according to the invention are defined by the dependent claims.

An exemplary embodiment of the supporting frame according to the invention is described below with reference to the drawing, in which:

FIG. 1 shows a frame variant with two free-standing supporting columns,

FIG. 2 shows the frame according to FIG. 1, with an attachment means in vertical section, FIG. 3, in an exploded view and to an enlarged scale, shows the attachment means of the column connection with more details, and FIG. 4 shows the section along the line IV—IV in FIG. 3.

FIG. 1 shows two tubular columns 1 and 2 which, by schematically indicated feet arrangements 1.1, 2.1, are configured so as to be inherently stable and are provided with suspension slots 3, parallel to the longitudinal axis, for equipping with extension arms or supporting arrangements for the presentation of merchandise in a known manner. To ensure the stability of the columns 1, 2, they are connected to one another non-positively by means of a cross connection 4 arranged in the lower column area, preferably in their foot area. The advantage of such a connecting arrangement is that the greatest part of the column length is available for the arrangement of merchandise supporting elements on a robust supporting frame composed of system parts according to the modular construction principle.

FIG. 2, to a larger scale, shows on the left an attachment means in section. Two connecting tubes 5, 6 running in parallel at a vertical distance are firmly anchored in an attachment housing 8 by means of screws 7. As revealed in FIG. 3, the connecting tubes 5, 6 contain anchoring plates 9 having a central tapped hole 10. The tube ends sit in mating recesses 11 of the attachment housing 8 and are detachably connected to the latter according to FIG. 2 by the screws 7. This type of tube fixing enables the user of the supporting frame according to the invention to employ connecting tubes 5, 6 of the respectively matching length when constructing a frame.

The attachment housing 8 has a locating opening 12 at the front face in which there is mounted a clamping bracket 13, consisting of a base plate 14 and a catch web 15 which is welded thereto and has, for example, three catch projections 16. During assembly of the cross connection 4 (FIG. 1), the clamping bracket 13 is first of all held loosely in its locating opening 12 by a clamping screw 17 which is mounted in a housing web 18. The clamping screw 17 is tightened after the cross connection 4 is attached to the two columns 1 and 2, the projections 16 of the clamping bracket 13 passing through related slots 3 and as a result gripping behind the tube wall. Consequently, the catch projections 16, on the inside and the front face 19 (FIG. 4) of the attachment housing 8, bear against the related supporting column 1, 2 on the outside in a positive and non-positive manner.

In order to prevent the cross connection 4 from being lifted off the allocated tubular column 1, 2 in the event of undesired or accidental slight loosening of the clamping screw 17, the attachment housing 8 (FIGS. 3, 4) on its top side, has a retaining lug 21 projecting radially inward beyond the front face 19. This retaining lug 21, when catch projections 16 are inserted into the allocated slots 3, reaches beneath the top narrow side wall of the slot 3 occupied by the topmost catch projection 16 and, in its function as a stop element, prevents the cross connection 4 from being lifted off the related column 1, 2. Thus the cross connection 4 can be lifted off one of the columns 1, 2 only if the attachment housing 8 can be pulled away from the column to an extent corresponding to the wall thickness of the column.

The front face 19 of the attachment housing 8 has a surface contour complementary to the outer contour of the supporting column 1, 2. The head of the clamping screw 17 always remains accessible for manipulating the cross connection 4 and can be concealed by an inverted-U-shaped hood 20 (FIGS. 1, 2) covering the connecting tubes 5, 6.

It goes without saying that the cross connection 4, instead of two connecting tubes 5, 6, can also be configured with three or more connecting tubes 5, 6 by widening the attachment housing 8. Likewise, the number of catch projections 16 on the clamping brackets 13 is not limited to three. Clamping brackets having two or four catch projections 16 can also be used.

I claim:

1. A supporting frame, comprising two or more free-standing tubular columns having respective longitudinal axes, each column being provided with slots parallel to the longitudinal axis thereof for locating extension arms or supporting arrangements, and a cross connection which couples adjacent tubular columns to one another to form a modular construction, the cross connection including two or more connecting tubes detachably secured at their two ends in one attachment housing of a pair of attachment housings, each of the attachment housings having a clamping bracket provided with catch projections facing a corresponding one of the tubular columns for engaging the slots of the corresponding one of the tubular columns, a front face, which faces the corresponding one of the tubular columns and which has a surface configuration complementary to the surface of the corresponding one of the tubular columns, and clamping means for clamping the clamping bracket against its associated attachment housing to thereby connect the attachment housing to the corresponding one of the tubular columns by pressure applied by the clamping means.

2. The supporting frame as claimed in claim 1, wherein the clamping device is a clamping screw which is to be actuated from the rear of the attachment housing, which is supported in the attachment housing and which has a threaded shank engaged with the attachment bracket.

3. The supporting frame as claimed in claim 1 or 2, wherein the ends of the connecting tubes are inserted in mating recesses on the rear of the attachment housing and are held by a screw connection.

4. The supporting frame as claimed in claim 1, wherein the attachment housing, on its top, contains a retaining lug which projects radially inward beyond the front face and, when catch projections are inserted into the slots of the tubular columns, reaches beneath a top narrow side wall of the slot occupied by a topmost catch projection.

* * * * *